United States Patent [19]
Model et al.

[11] Patent Number: 4,763,014
[45] Date of Patent: Aug. 9, 1988

[54] BACKUP PROTECTION SWITCH TO PREVENT REVERSE POWER FLOW IN A UPS

[75] Inventors: Michael J. Model, Denville; Daniel A. Wright, Parsippany, both of N.J.

[73] Assignee: American Telephone and Telegraph Company, AT&T Bell Laboratories, Murray Hill, N.J.

[21] Appl. No.: 99,041

[22] Filed: Sep. 21, 1987

[51] Int. Cl.[4] .............................................. H02J 9/04
[52] U.S. Cl. ........................................ 307/66; 307/46; 307/86; 361/84
[58] Field of Search ..................... 307/46, 64, 65, 66, 307/86; 361/84, 102, 3

[56] References Cited

U.S. PATENT DOCUMENTS

| | | | |
|---|---|---|---|
| 3,614,461 | 10/1971 | Speer et al. | 307/66 |
| 3,971,957 | 7/1976 | Hase | 307/64 |
| 4,400,624 | 8/1983 | Ebert | 307/66 |
| 4,506,766 | 3/1985 | Watanabe | 307/66 |
| 4,598,330 | 7/1986 | Woodworth | 361/3 |

*Primary Examiner*—William H. Beha, Jr.
*Attorney, Agent, or Firm*—Alfred G. Steinmetz

[57] ABSTRACT

A UPS system includes a mechanical backup input line isolation switch to provide mechanical isolation between the primary energy source connected to the input line and the secondary energy source upon detection of a failure of an electronic isolation switch normally providing isolation between the input line and the secondary energy source. Detection of such a failure is accomplished by means of a dummy load which is connected in across the input line. Its impedance is sized to permit a small low level of current flow, above normal leakage current levels permitted by a functioning semiconductor electronic line switch, if energy is reverse coupled from the reserve energy source via a failed electronic line switch without draining significant power from the primary energy source when the UPS is normally operative and deriving power from the primary energy source. A power flow direction sensing circuit detects the direction of power flow at the input to which the primary energy source is connected to the UPS and a control circuit responsive to the power flow direction sensing circuit disconnects the input from the primary energy source if reverse power flow is detected by activating a mechanical switch to disconnect the input from the primary energy source.

8 Claims, 3 Drawing Sheets

BACKUP PROTECTION SWITCH TO PREVENT REVERSE POWER FLOW IN A UPS

FIELD OF THE INVENTION

This invention relates to a backup input Line Isolation switch and its control for a UPS (uninterruptible power supply), having both primary and reserve energy sources, and specifically for interrupting reverse power flow from the reserve energy source back into the primary energy source should the semiconductor electronic line isolation switches fail by mechanically separating the UPS input line from the Commercial AC Line supplying primary energy to the UPS.

BACKGROUND OF THE INVENTION

A typical UPS is one in which a primary energy source (normally a commercial AC line) and a reserve energy source (normally a battery voltage driven inverter) are both coupled to supply energy input to an energy coupling apparatus such as a transformer with two independent energy inputs. Each input is functional to supply power to a single output. In other arrangements the two sources of energy may be joined in series so that the primary source of energy charges the reserve source.

When power is being supplied from the reserve energy source, the UPS is disconnected from the commercial AC line by semiconductor electronic isolation switches located in the input line. Electronic isolation switches are normally used in place of mechanical switches in order to avoid the transients associated with the switching of mechanical switches. Should these electronic isolation switches fail in a shorted or conducting mode, power supplied by the reserve energy source may be fed back into the primary line source directly through the energy coupling apparatus. There generally is no indication of this switch failure until a current path is accidentally completed across the AC line permitting such current flow. This is a potential safety hazard which is often not apparent until such a current path is completed.

SUMMARY OF THE INVENTION

Therefore in a UPS system, embodying the principles of the invention, a backup input line isolation switch and its control circuit is operative, during operation of the reserve energy source portion of the power supply in supplying power to the output, to provide mechanical isolation between the primary energy source connected to the input line and the secondary energy source upon detection of a failure of an electronic isolation switch normally providing isolation between the input line and the secondary energy source. Detection of such a failure is accomplished by means of a dummy load which is connected in shunt across the input line. Its impedance is sized to permit a small low level of current flow, above normal leakage current levels permitted by a functioning semiconductor electronic line switch, if energy is reverse coupled from the reserve energy source via a failed electronic line switch without draining significant power from the primary energy source when the UPS is normally operative and deriving power from the primary energy source. A power flow direction sensing circuit detects the direction of power flow at the input to which the primary energy source is connected to the UPS and a control circuit responsive to the power flow direction sensing circuit disconnects the input from the primary energy source if reverse power flow is detected by activating a mechanical switch to disconnect the input from the primary energy source.

This arrangement isolates the reserve energy source and/or ouput of the UPS, depending on the circuit topology, from the input AC line of the primary energy source by operation of a mechanical switch upon failure of the electronic switch and hence prevents a coupling of energy from the reserve energy source to the primary energy source line in the event that any of the electronic isolation switches should fail.

DETAILED DESCRIPTION

Figure 1:
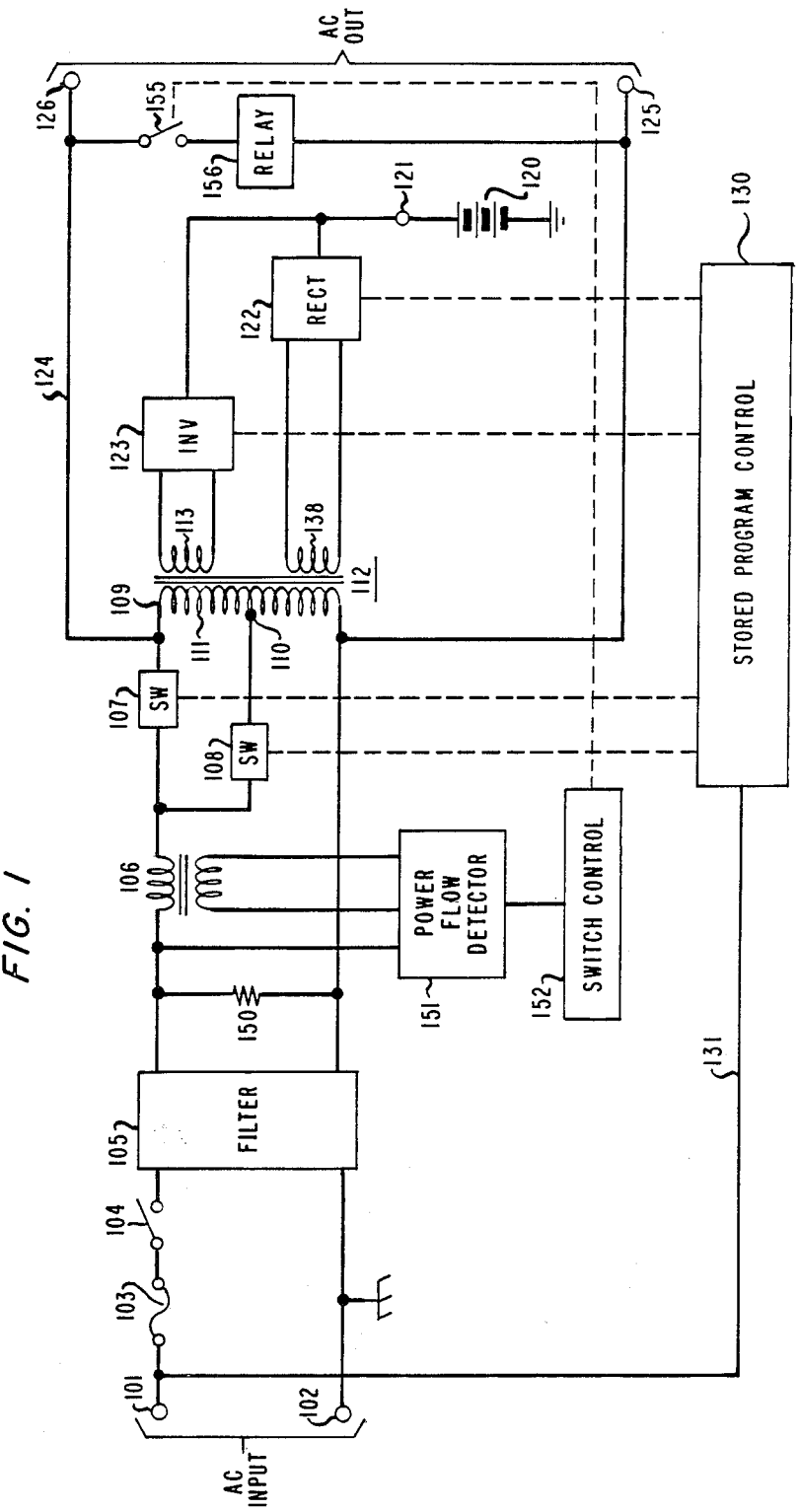
FIG. 1 is a detailed block and schematic diagram of a UPS including the mechanical backup line isolation switch and its control circuitry.

A UPS embodying backup protection according to the principles of the invention is shown in FIG. 1. The UPS shown is a parallel processing system with primary power derived from a commercial AC line connected to the AC input terminals 101 and 102 and reverve power from a DC voltage source (battery) 120 being connected to DC input terminal 121 which in turn is coupled to a charging rectifier 122 and an inverter circuit 123.

During normal operation of the UPS when the commercial AC is in its normal acceptable state, output power is fully derived from the primary energy source AC voltage supplied to input terminals 101, 102. This primary energy input is coupled through a fuse 103, a mechanical isolation backup switch 104, a filter circuit 105, and a current sensing winding 106 to two semiconductor electronic line switches 107 and 108 which are in turn coupled to an end terminal 109 and a tap 110 of winding 111 of transformer 112. An output line 124 directly couples the end terminal 109 to an AC output terminal 126.

The two line switches 107 and 108 are under control of the stored program control unit 130 which may comprise a microprocessor system. The control unit 130 monitors the quality of the AC input via lead 131 and when the AC input is fully acceptable it causes line switch 107 to conductively connect the input to the end terminal 109 of winding 111 which in turn is directly connected to the output terminal 126. During normal operation when the input AC voltage is satisfactory, the DC voltage source 120 is charged from the input AC voltage via winding 138 and rectifier charger 122. If the control unit 130 determines that the input voltage is substandard (i.e. a brownout), the line switch 107 is disabled and line switch 108 is enabled to connect the AC input to tap 110 of winding 111. This provides a voltage boost to the input AC voltage by means of the auto transformer formed by the subsection fo winding 111 and provides an adequate signal at terminal 109 which is connected to the output 126.

If the input AC voltage falls to a low level wherein a voltage boost is not sufficient to provide the desired output voltage level, power to the output is derived from the reserve DC voltage source 120. The supplied DC voltage is inverted into AC voltage by inverter 123 and is coupled to input winding 113 of transformer 112.

During operation of the UPS from the reserve DC voltage source both line switches 107 and 108 are disabled to prevent the flow of energy from the reserve source voltage source back into the primary AC energy source coupled to the input terminal 101 and 102. Should either line switch 107 or 108 conduct, while supposedly in a turned off state, power flow from the reserve DC voltage source 120 into the primary AC source line creates a hazard that is not apparent until the AC source lines are accidentally conductively coupled.

In order to determine if either line switch 107 or 108 has failed, a dummy load 150 of fairly high resistance is connected across the input line just subsequent to the filter 105. This dummy load 150 has an impedance selected to permit a reverse current flow above leakage current values should any of the electronic isolation switches 107, 108 fail shorted or conducting. This current flow is sensed by the power flow direction detector 151 and upon detection of a reverse current flow which is derived from the battery voltage source 120, a switch control circuit 152 responds by closing the relay switch 155. This particular arrangement uses output power to energize the relay coil 154 which in turn causes switch 104 to operate and disconnect the input from the primary AC source voltage at input terminals 101 and 102 by separating or opening the contacts of the mechanical switch 104.

Figure 2:
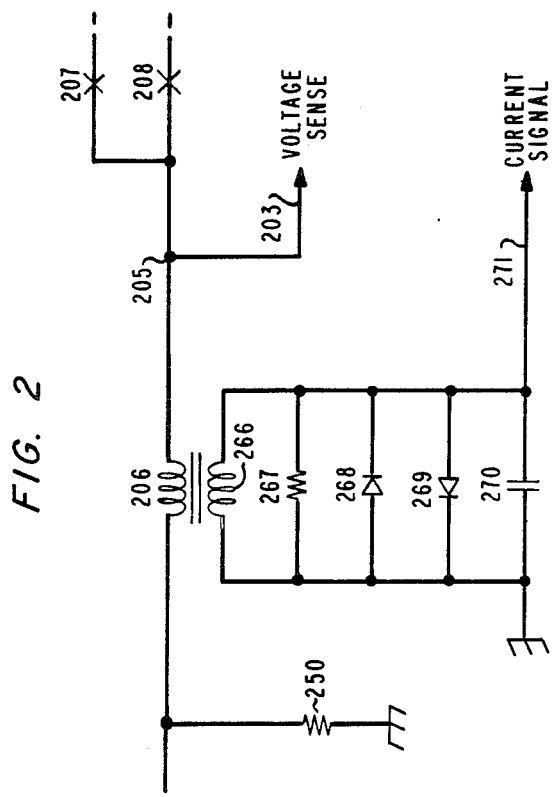
FIG. 2 is a schematic diagram of an input line current sensing circuit used in an embodiment of the invention.

The power flow detecting circuit is shown schematically in FIG. 2 and includes a voltage sensing node 205 and a current sensing winding 206 connected in series with the input line switches 207 and 208. A secondary winding 266 is magnetically coupled to sensing winding 206 and is shunted by a resistor 267, two oppositely poled diodes 268 and 269 and a charge storage capacitor 270.

The dummy resistor 250 draws an AC current from the inverter upon failure of a line switch when power is suppled from the reserve voltage source. This current responsive to the reserve energy source flows through the current sensing winding 206. The secondary winding 266 applies a proportionate signal through an impedance 267 to develop a voltage waveform representative of the sinusoidal current which alternately charges the capacitor 270 to develop a voltage waveform at the output terminal 271. A voltage signal waveform is provided by node 205 to which lead 203 is connected. Diodes 268 and 269 are included to clamp the voltage across the secondary winding 266 and limit the power dissipated.

Figure 3:
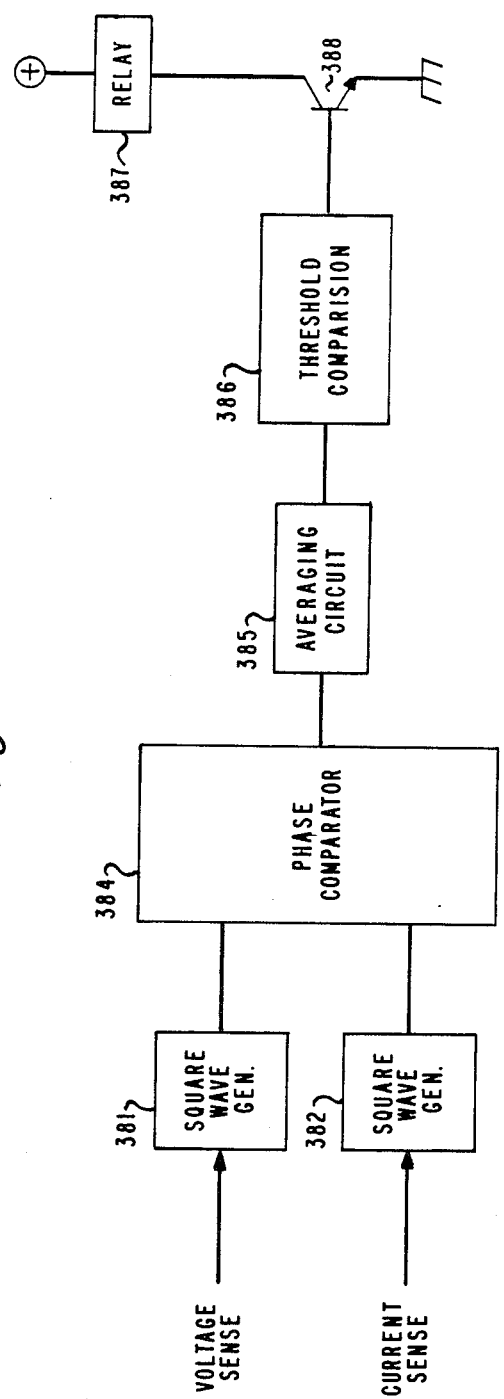
FIG. 3 is a detailed block and schematic diagram of the control circuitry to determine current flow direction and operate the backup isolation switch located subsequent to the input of the UPS.

The phase relation between these voltage and current waveforms is utilized by the control circuitry of FIG. 3 to determine the direction of power flow sensed by current sense winding 206 and voltage sense node 205. The current and voltage waveform signals are applied to the switch control circuit which is shown in block schematic in FIG. 3. The sensed current and voltage signals are reconstituted into pulse signals by the square wave generators 381 and 382 respectively. The two square wave signals are phase compared in a phase comparator 384 whose output is applied to an averaging circuit 385 to derive a DC voltage level representative of the phase direction and magnitude difference. This DC voltage level is applied to a threshold comparator 386. If the voltage threshold is exceeded, indicating a reverse power flow, the relay coil 387 is de-energized by biasing transistor 388 off. Relay coil 387 when de-energized closes switch 155 (in FIG. 1) which in turn energizes the relay coil 156 (in FIG. 1) and enables operation of the mechanical backup switch 104.

What is claimed is:

1. An uninterruptible power supply, comprising:
   a first input for accepting a primary source of energy,
   a second input for accepting a reserve source of energy,
   an output for accepting a load to be energized,
   an energy coupling apparatus for coupling energy from the first and second inputs to the output and capable of coupling energy from the second input to the first input, and including first coupling means for directly coupling the first input to the output and second coupling means for coupling the first input to the output with amplification.
   first and second primary disconnect switches for decoupling the first input from the first and second coupling means of the energy coupling apparatus when energy is being supplied to the output from the second input,
   a backup disconnect switch for disabling energy flow from a reserve energy source connected to the second input into the first input,
   means for faciltating a flow of energy from the second input to the first input should at least one of the first and second primary disconnect switches fail in a mode enabling energy flow through at least one of the first and second primary disconnect switches,
   means for sensing energy flow from the energy coupling apparatus to the first input and operative to enable the backup disconect switch to open.

2. An uninterruptible power supply, comprising;
   a first input for accepting a primary source of energy,
   a second input for accepting a reserve source of energy,
   an output for accepting a load to be energized,
   an energy coupling apparatus for coupling energy from the first and second inputs to the output and capable of coupling energy from the second input to the first input,
   a primary disconnect switch for decoupling the first input from the energy coupling apparatus when energy is being supplied to the output from the second input,
   a backup disconnect switch for disabling energy flow from a reserve energy source connected to the second input into the first input,
   means for facilitating a flow of energy from the second input to the firs input should the primary disconnect switch fail in a mode enabling energy flow through the primary disconnect switch,
   means for sensing a direction of energy flow between the energy coupling apparatus and the first input,
   means responsive to the means for sensing a direction of energy flow from the energy coupling apparatus to the first input for activating the backup disconnect switch.

3. An uninterruptible power supply, comprising:
   a first input for accepting a primary source of energy,
   a second input for accepting a reserve source of energy,
   an output for accepting a load to be energized,
   a power transformer including first and second windings for receiving energy from the first and second inputs and capable of coupling energy from the second input to the first input, a primary disconnect switch for decoupling the first input from the first winding of the power transformer when energy is being supplied to the output from the second input, a backup disconnect switch for disabling energy flow from a reserve energy source connected to the second input into the first input, means for facilitating a flow of energy from the second input to the first input should the primary disconnect switch fail in a mode enabling energy flow through the primary disconnect switch, means for sensing a direction of energy flow between the first winding of the power transformer and the first input, means responsive to the means for sensing a direction of energy flow from the first winding of the power transformer to the first input for activating the backup disconnect switch.

4. An uninterruptible power supply as claimed in claim 3 wherein an end terminal of the first winding is directly connected to the ouput and further including a second disconnect switch for coupling the input to a tap of the first winding, the second disconnect switch being activated to conduct if a signal at the input is to be amplified and the means for facilitating enabling flow of energy from the second input to the first input should the second disconnect switch fail.

5. An uninterruptible power supply, comprising:
a first input for accepting a primary source of energy,
a second input for accepting a reserve source of energy,
an output for accepting a load to be energized,
an energy coupling apparatus for coupling energy from the first and second input to the output and electrically connected to enable the coupling of energy from the second input to the first input, and further including at least a direct electrical connection connecting the first input to the output,
a primary disconnect switch for decoupling the first input from the energy coupling apparatus when energy is being supplied to the output from the second input,
a backup disconnect switch for disabling energy flow from a reserve energy source connected to the second input into the first input,
means for facilitating a flow of energy from the second input to the first input should the primary disconnect switch fail in a mode enabling energy flow through the primary disconnect switch,
means for sensing a current flow to the means for facilitating,
means for ascertaining a direction of current flow connected to the means for sensing a current flow,
means responsive to the means for ascertaining a direction of current flow from the energy coupling apparatus to the first input for activating the backup disconnect switch.

6. An uninterruptible power supply as defined in claim 5 and further including a second disconnect switch for decoupling the first input from the energy coupling apparatus and the means for facilitating energy flow being operative should the second disconnect switch fail.

7. An uninterruptible power supply comprising;
a first input for accepting a primary source of energy,
a second input for accepting a reserve source of energy,
an output for accepting a load to be energized,
a transformer for coupling energy from the first and second input to the output and including;
a primary winding, a secondary winding, and the output being connected to an end terminal of the primary winding;
a first semiconductor disconnect switch connecting the first input to the end terminal of the primary winding,
a second semiconductor disconnect switch connecting the first input to an intermediate tap of the primary winding,
the second input being connected to the secondary winding,
a dummy load connected to the first and second semiconductor disconnect switch and operative for facilitating a current flow supplied from the second input greater than a leakage current of the first and second semiconductor disconnect switch should at least one of the first and second semiconductor disconnect switches fail so as to conduct current,
current direction sensing means including;
current sensing means connected between the dummy load and the first and second semiconductor disconnect switches,
voltage sensing means connected between the dummy load and the first and second semiconductor disconnect switches;
signal phase comparison means for ascertaining a phase relation between signals detected by the current sensing means and the voltage sensing means in order to determine a direction of current flow;
a mechanical switch operative for disabling energy flow from the reserve energy source to the primary energy source and responsive to the signal phase comparison means.

8. An uninterruptible power supply comprising:
a first input for accepting a primary energy source,
a second input for accepting a reserve energy source,
an output for accepting a load to be energized,
coupling means for connecting the first and second inputs to the output,
semiconductor switches operative for disconnecting the first input from the coupling means when power is supplied to the load from the second input,
current enabling means for permitting current flow from the second input to the first input upon failure of the semiconductor switches,
current direction sensing means connected between the first input and the coupling means for detecting reverse current flow from the second input to the first input, and
mechanical isolation means for isolating the first input from the second input in response to the current direction sensing means.

* * * * *